United States Patent [19]

Burnett

[11] Patent Number: 4,494,780
[45] Date of Patent: Jan. 22, 1985

[54] LIQUID PIPING SADDLE ASSEMBLY CONNECTING A BRANCH PIPE TO A MAIN PIPE

[75] Inventor: Curtis E. Burnett, Seattle, Wash.

[73] Assignee: Romac Industries, Inc., Seattle, Wash.

[21] Appl. No.: 293,664

[22] Filed: Aug. 17, 1981

[51] Int. Cl.³ .............................................. F16L 25/00
[52] U.S. Cl. ..................................... 285/177; 285/199
[58] Field of Search ............... 285/197, 198, 199, 180, 285/8, 177, 156

[56] References Cited

U.S. PATENT DOCUMENTS

| | | | |
|---|---|---|---|
| 1,586,706 | 6/1926 | Russell . | |
| 2,304,114 | 12/1942 | Moore | 285/8 |
| 2,316,974 | 4/1943 | Risley | 285/199 |
| 2,755,106 | 7/1956 | Brennan et al. | 285/7 |
| 2,826,435 | 3/1958 | Schustolk | 285/199 X |
| 3,218,093 | 11/1965 | Carlson | 285/197 |
| 3,331,622 | 7/1967 | Bagnulo | 285/199 X |
| 3,406,988 | 10/1968 | Jones | 285/24 |
| 3,463,516 | 8/1969 | Munton et al. | 285/9 |
| 3,489,441 | 1/1970 | Malcolm | 285/197 |
| 3,663,042 | 5/1972 | Fowler | 285/199 |
| 3,796,445 | 3/1974 | Strott | 285/197 X |
| 3,958,313 | 5/1976 | Rossborough | 285/237 |
| 3,967,839 | 7/1976 | Dunmire | 285/199 |
| 4,175,581 | 11/1979 | Peterson | 285/199 X |

FOREIGN PATENT DOCUMENTS 2528758 12/1976 Fed. Rep. of Germany ...... 285/197

OTHER PUBLICATIONS

D-50 Universal Sewer Saddle 90° by Daigle Aqua Inc., 2 pp.
Pioneer Sewer Saddle, by Hersey Products Inc., 1 p.
Sanitary Sewer Tapping Tee by Quick-Way, Fowler Sewer Taps, Inc., 1 p.

*Primary Examiner*—Dave W. Arola
*Attorney, Agent, or Firm*—Roy E. Mattern, Jr.

[57] ABSTRACT

Liquid piping saddle assemblies, in two sizes, to connect to branch pipes of 4 inch and 6 inch diameters, and to all sizes of main pipes, in respect to each assembly has only one elastomeric gasket, which seals both the branch pipe and the main pipe. Each gasket integrally includes a smaller hollow cylinder to surround and sealably receive an end of a branch pipe, and a larger hollow cylinder shaped to abut and to seal the outside of a smallest main pipe without bulging and the outside of a larger main pipe upon bulging, about the exterior of a hole made in the main pipe. In the gasket sealing surface at the main any imaginary transverse line lies in a geometric plane which is perpendicular to the common centerline of the gasket. Each gasket has an interior circular abutment to stop the insertion of the branch pipe, and an exterior abutment to position a hollow cylindrical metal casting, which fits over the smaller hollow cylinder. An adjustable holding means partially encircles the main pipe and engages the hollow cylindrical metal casting forcing it against the exterior abutment, thereby firmly holding the gasket against the main pipe.

10 Claims, 9 Drawing Figures

LIQUID PIPING SADDLE ASSEMBLY CONNECTING A BRANCH PIPE TO A MAIN PIPE

BACKGROUND OF THE INVENTION

The older practice of installing a main pipe line, such as a main sewer line, and including at selected spaces connecting subassemblies for side or branch pipe lines, such as side sewers or laterals, is essentially no longer followed. This is true because it has been found to be easier and lower in cost to later excavate and to then tap, i.e. tie into, the main with a lateral, than to spend time in locating the previously buried branch stubs, i.e. the connecting subassemblies. Therefore, there have been comparatively recent inventions directed at providing the connecting subassemblies, such as:

The Pioneer sewer saddle manufactured by Hersey Products, Inc., 250 Elm Street, Dedham Mass. 02026, which includes a cast iron saddle especially formed to receive a lateral and to fit the curvature of a main, with this casting being liquid tight itself and being sealed to the lateral by a M-ring and sealed to the main by using a mastic sealer on its contoured surfaces abutting the main. Liquid tight castings of many sizes must be stocked and handled;

The Daigle D-50 Universal sewer saddle manufactured by Daigle Aqua, Inc., P.O. Box 984, Plattsburgh, N.Y. 12901, also requires a liquid tight casting which receives an O-ring for sealing about the exterior surface of a branch pipe, i.e. a lateral, and utilizes an especially formed gasket positioned between the liquid tight casting and outside of the main;

A sanitary sewer tapping tee, offered under the trademark, Quik-Way, and disclosed in U.S. Pat. No. 3,663,042, entitled, Sewer Tap, is arranged by Dwight W. Fowler to utilize one O-ring seal to seal both around the lateral and the main, when utilizing an especially formed curved clamping plate; and A connection assembly between a lateral and a sewer pipe is disclosed by Albert J. Jones in his U.S. Pat. No. 3,406,988 wherein he uses an elastic sleeve to serve in sealing both the lateral and the main sewer pipes. This elastic sleeve is inserted into a hole in the main and about the lateral. A tubular wedge is inserted inside the elastic sleeve where it is inserted into the hole in the main. A hose clamp is tightened about the exterior of the elastic sleeve improving its seal about the lateral.

Although all of these comparatively recent inventions are recognized for their merits they represent connecting subassemblies which require a reasonably high level of skill to be exercised by their installers. For example the sewer tap illustrated in U.S. Pat. No. 3,663,042, was known to be wrongly installed with the lateral extending into the interior of the main. Moreover, even though the initial installation might have been correct, because of the lack of a positive stop or abutment, subsequent earth movements have been known to cause the unwanted entry of the end of the lateral into the main. Moreover on certain larger installations the end of the lateral had to be contoured to avoid its entry into the main. Such contouring is often done at the job site. However, some manufacturers contour the ends of the laterals in the factory, which adds to the cost of the branch pipes. Also because contoured end pipes are needed, they must be timely and especially ordered and often stocked, thereby adding to the overall costs of these installations. The insert placed inside the elastic sleeve of Albert Jones' connection joint, shown in U.S. Pat. No. 3,406,988, is believed to require a high level of skill to insure the correct initial placement and the continued correct placement of this insert called a tubular wedge. Both the inner ends of the tubular wedge and elastic sleeve are formed essentially alike so they will not enter into the interior of the main. Their precise placements are critical. In the Pioneer sewer saddle and the Daigle sewer saddle, especially formed castings which must be liquid tight are utilized. For these and other reasons, there remained a need to provide yet another liquid piping saddle assembly to connect a branch pipe to a main pipe, i.e. a lateral to a main.

SUMMARY OF THE INVENTION

A liquid piping saddle assembly is provided in just a few embodiments with several interchangeable parts to enable comparatively lesser skilled persons to reliably and sealably connect a branch pipe to a main pipe, i.e. a lateral to a main. In respect to few embodiments, one set of saddle assemblies are directed to four inch laterals, which may be connected to mains having an outside diameter as small as 6.275 inches and as large as 25 inches, and another set of saddle assemblies, are directed to six inch laterals, which may be connected to mains having an outside diameter as small as 8.3 inches and as large as 25 inches.

The respective integral gaskets of elastomer which have the integral smaller and larger hollow cylinders are respectively formed to match the four and six inch laterals and the respective size ranges of the mains. Also these gaskets are formed to receive lateral clay pipe in one embodiment using a hose clamp and in another embodiment to receive lateral PVC, C.I., soil, or A.C.M.E. pipes using semi circular internal integral ribs.

The castings with integral, upwardly sloping, spaced opposite ears, are not required to be fluid tight and have no compound and/or other complicated matchable curved surfaces. Only two sizes of castings are needed. One larger size, equipped with an integral flange, fits the six inch diameter laterals, and the smaller size, without an integral flange, fits the four inch diameter laterals.

The tee-headed bolts have one single bar head welded to a metal strap and the other spaced dual bar head welded in part to the bolt and then slidably secured to the metal strap. Upon installation, the strap, after passing under the main is then threaded through the spaced bar head, and thereafter bent back alongside itself and adjacent the exterior of the main, to be locked into place, as the nuts are tightened against the washers and against the integral sloping spaced opposite integral ears of the casting.

All the gaskets of elastomer have an interior circular abutment to stop the endwise insertion of the lateral to keep it from entering the interior of the main. This abutment is positioned so the inserted end of the lateral does not have to be contoured to match the hole in the main. The outside abutment positions the casting at the preferred spaced distance away from the main. The circular ends of the larger diameter integral portions of the gasket all have an inside diameter as large as the diameter of any hole to be made in the main to connect a lateral.

These circular ends are especially contoured on oppositely spaced edges to match in some degree the exterior surface of the main. In connecting the gaskets to smaller diameter mains there is little or no distortion of the gasket adjacent the main. However in connecting the gaskets of elastomer to the larger diameter mains, there is distortion, with the distortion increasing as the main sizes become larger with respect to specified interconnections between laterals and mains.

At all times, the especially contoured end of the larger hollow cylinder of the gasket of elastomer, which is to abut the main about a hole made in the main to receive the liquid flow from the lateral, commences in a surface, wherein any imaginative transverse line in the surface always lies in a geometric plane which is perpendicular to the common centerline of the gasket, casting and the lateral. With this contoured end of the larger hollow cylinder of the gasket contacting the exterior of the main, as the nuts are tightened and the strap is drawn tight, there is a resulting bulging of the gasket of elastomer, which is very observable, especially as the lateral is connected to a lateral main. In this way, one embodiment of a gasket of elastomer may be used to make the sealed contact with a main, which is one pipe size of many pipe sizes in a wide range of sizes.

In respect to the bulging of this elastometric larger hollow cylinder of the contoured gasket, its bulging capability is assured via its overall design. As the inside circular edge of the gasket first contacts the main, the overall compressive load transmitted through the gasket first commences at an axially offset locale at the main, i.e. around the inside circular edge of the gasket, thereby causing a bending force in the gasket walls at this circular location. This bending force, causing a side loading, coupled with the continuing compressive force, creates the bending of the larger hollow cylinder walls into a bulge which becomes more noticeable as the laterals are being connected to larger diameter mains. The walls of the larger hollow cylinder, as viewed to one side or the other side in a cross section, such as in FIGS. 2 and 6, are relatively long in comparison to their thickness. This larger hollow cylinder sometimes referred to as the skirt has the contoured end which undergoes the bulging, and has its other end arranged in an axial plane. By such bulging action all the imaginative transverse lines in the contoured surface of the gasket come into contact with the outer surface of the main, about the hole in the main, which receives the liquid flow from the lateral.

A contractor, in following this newer practice undertaken by him or another contractor of installing a main pipe line without pre-existing branch partial connections, when later installing branch lines, i.e. laterals, knows what size of laterals and what kind of laterals will be used. He therefore pre-selects the best embodiments of this liquid piping saddle assembly he needs, and then assisted by others, often less skilled, ably connects the laterals to the mains. His supply of embodiments, and parts thereof, or his supplier's supply of embodiments and parts thereof, need not be as extensive in respect to so many detailed sizes and configurations of respective components, for this liquid piping saddle assembly, in its fewer embodiments, meets all the requirements of making excellent liquid tight connections, which remain flexible and sealed, at all times, even when earth settles about the piping.

DESCRIPTION OF THE DRAWINGS

Preferred embodiments of this liquid piping saddle assembly connecting a branch pipe to a main pipe are illustrated in the drawings, wherein.

DESCRIPTION OF THE PREFERRED EMBODIMENTS

Figure 5:
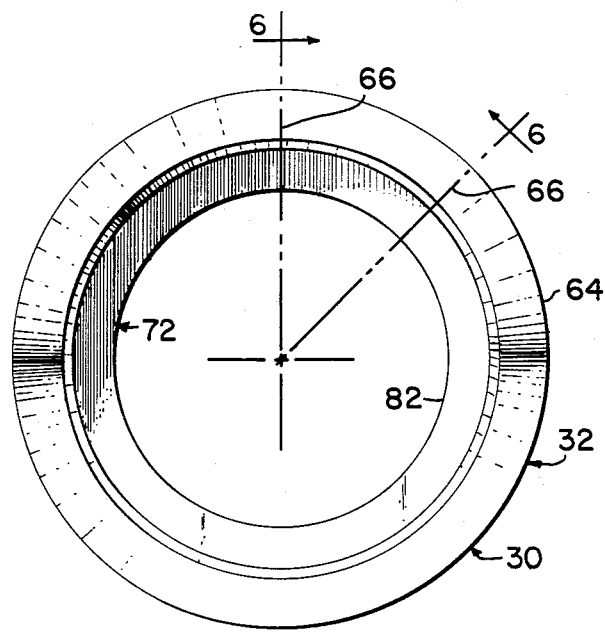
FIG. 5 is an end view of the gasket shown in FIG. 4, with respect to the end which seals against the main.
Figure 6:
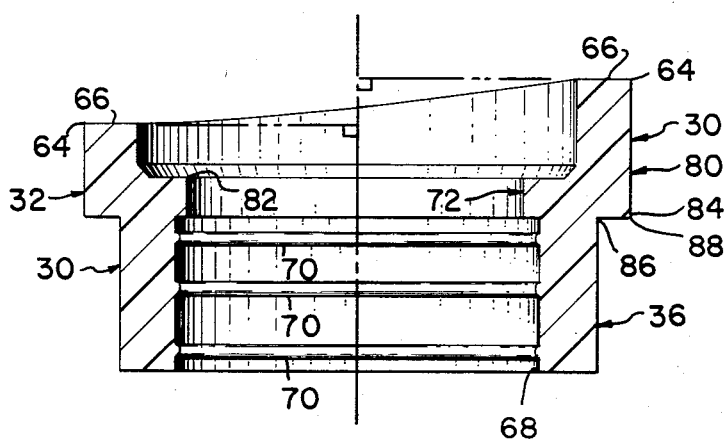
FIG. 6 is a dual sectional side view of the gasket shown on FIGS. 4 and 5, with the sections being taken as shown in the preceding FIGS. 4 and 5, as indicated by the section lines and symbols.
Figure 7:
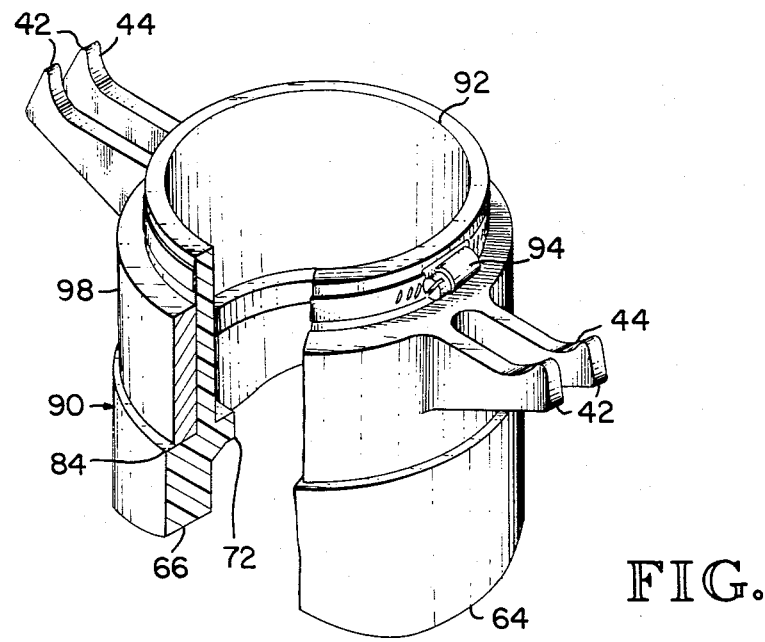
FIG. 7 is an isometric view, with portions removed, of the sub-assembly of the smaller casting and another embodiment of the gasket of elastomer without interior semi-circle cross sectioned sealing ribs, but with a reduced thickness of the smaller hollow cylinder which is surrounded by a hose clamp to aid in sealing about a clay pipe.
Figure 8:
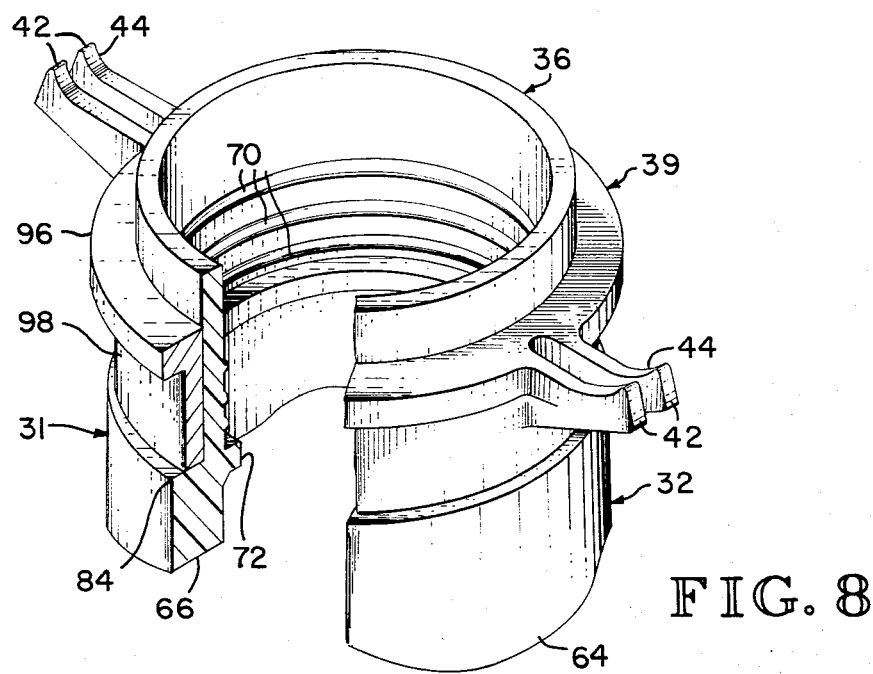
FIG. 8 is an isometric view, with portions removed, of the sub-assembly of the larger casting having an integral stiffening flange, and another larger embodiment of the gasket of elastomer, having the inner semi-circle cross sectioned sealing ribs and the interior abutment, which is common to all the gaskets to stop the entry of the branch pipe, so this lateral will never enter the interior of the main.

In the drawings, throughout FIGS. 1 through 6, a preferred embodiment is illustrated of the liquid piping saddle assembly 20, which is used in connecting a four inch lateral to a main which may be in the size range of 6.275 inches to 25 inches in diameter for many types of pipes, but generally not laterals designated as clay pipes. In FIG. 7, a preferred embodiment 22 is illustrated which is used in connecting a four inch clay lateral to a main in the size range of 6.275 to 25 inches. In FIG. 8, a preferred embodiment 24 is illustrated which is used in connecting a six inch lateral to a main which may be in the size range of 8.3 inches to 25 inches in diameter for many types of pipes.

Figure 1:
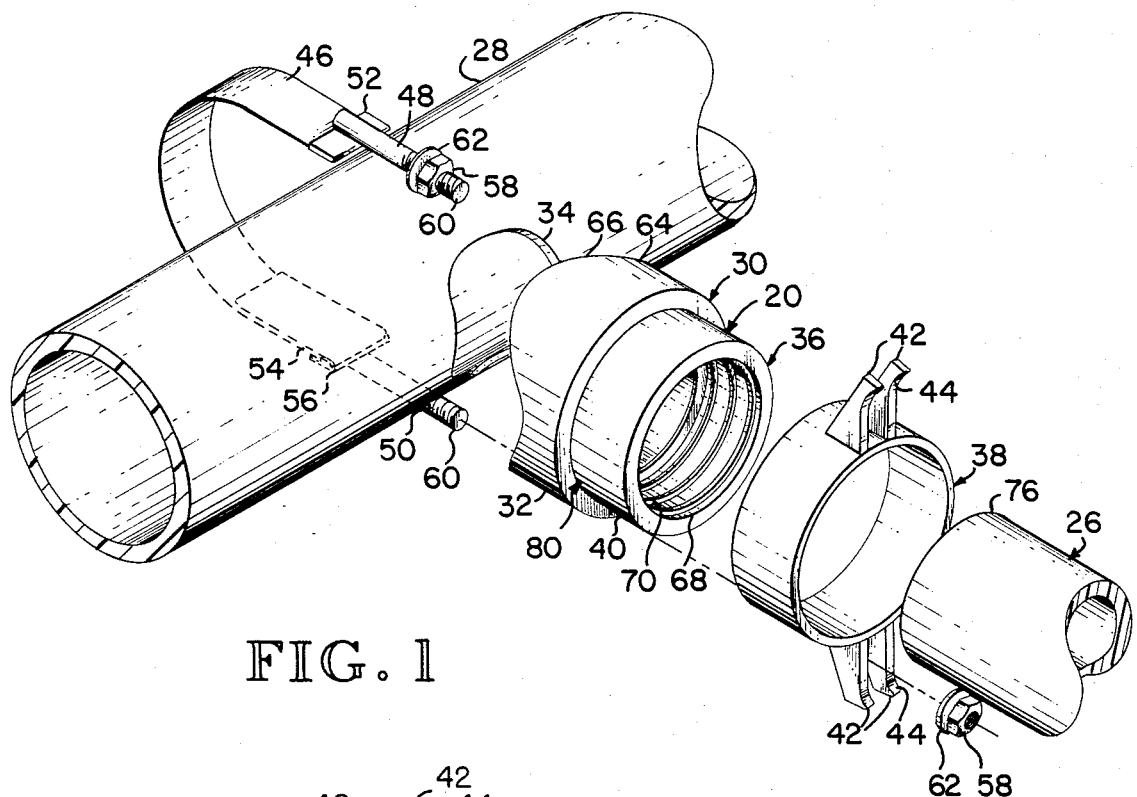
FIG. 1 is an exploded isometric view of the overall liquid piping saddle assembly to be fitted about a smaller branch pipe, i.e. lateral, and a comparatively small but larger main pipe, i.e. main.
Figure 2:
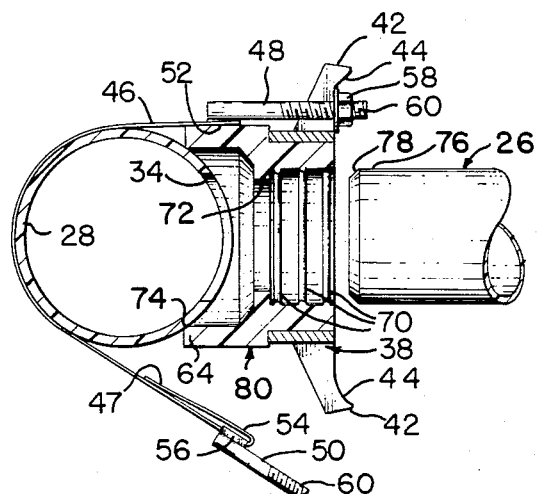
FIG. 2 is a side elevational view, partially in cross section, of the liquid piping saddle assembly shown in FIG. 1, with some of the parts being assembled and others about to be assembled, the lateral, i.e. branch pipe, not as yet inserted to contact the interior semi-circle cross sectional sealing ribs and the interior stop of the gasket, and before tightening of the strap.
Figure 2A:
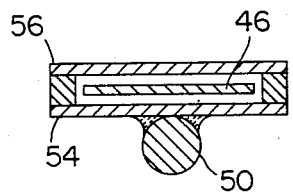
FIG. 2A is an enlarged view to show how one tee headed threaded bolt has two spaced bars, welded together at their ends to form a slotted tee head, through which the wide strap is passed when being adjusted in its length after passing about a main pipe from its initial welded securement to the other tee headed threaded bolt.
Figure 3:
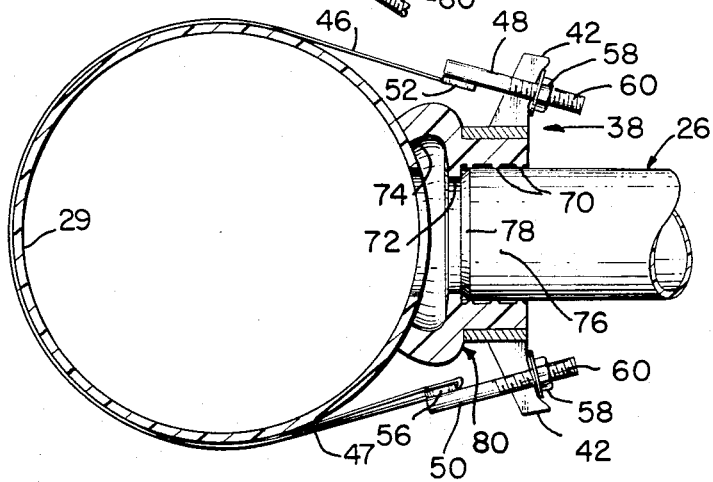
FIG. 3 is a side elevational view, partially in cross section, of the same embodiment of the liquid piping saddle assembly shown in FIG. 1, with all the parts being assembled, the lateral, i.e. branch pipe, being inserted to the interior stop of the gasket, and the gasket of elastomer being bulgingly compressed to seal against the exterior of a comparatively large main pipe.

In FIG. 1, in an exploded isometric view, the overall arrangements are illustrated of the liquid piping saddle assembly 20 in respect to its installation to direct liquids from a branch pipe, i.e. lateral 26, into a main pipe, i.e. main 28. The gasket 30 of elastomer is shown with its larger hollow cylinder 32 directed toward the main 28 for positioning about a hole 34 cut in the main 28 to receive the liquid flow from the lateral 26. The opposite in line smaller hollow cylinder 36 of gasket 30 is directed to receive lateral 26. A casting 38 is positioned to be moved over the outside 40 of the smaller cylinder 36. On opposite sides of the casting 38 are respective sets of integral spaced ears 42 which slope on an incline 44. A wide strap 46 is flexibly curved to fit about the main 28 and ultimately to be secured by using tee bolts 48 and 50. The wide strap 46 is welded to tee bolt 48 using bar 52, and it is slidably, bendably, and removably, secured to the tee bolt 50. Two spaced bars 54, 56 welded at their ends, and welded only by bar 54 to tee bolt 50 initially receive the wide strap 46 between them as shown in FIG. 2A. Thereafter the wide strap 46 is folded back alongside bar 56 when its active length has been determined during installation of the liquid piping saddle 20. As shown in FIGS. 2 and 3, the folded back portion 47 of the wide strap 46 is sufficiently long to be ultimately frictionally positioned between the outer surface of a respective main pipe 28 or 29 and the wide strap 46. The turning of the nuts 58 about the respective threads 60 of the tee bolts 48 and 50, aided by the washers 62, and utilizing the spaced ears 42 of the casting 38 eventually positions the liquid piping saddle 20 in place and the folded back portion 47 of the wide strap is frictionally and firmly held in the installed position illustrated in FIG. 3.

Figure 4:
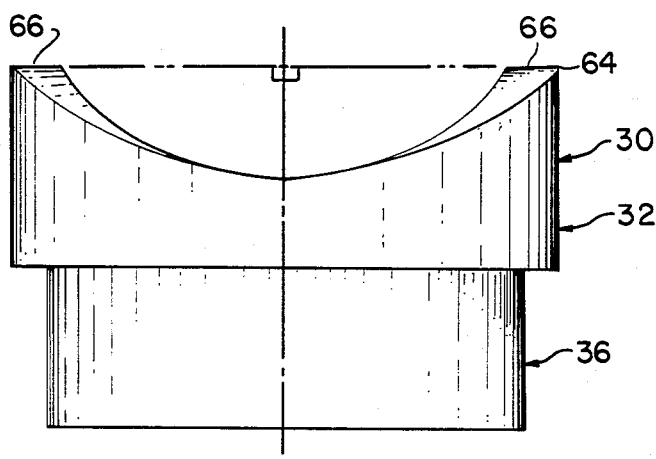
FIG. 4 is a side view of the gasket of elastomer which creates both the seals in respect to the lateral and main and which is liquid tight throughout its length, so the casting which surrounds it does not have to be liquid tight.

FIG. 2 is a side view of the components, shown in FIG. 1 of the liquid piping saddle 20 after partial assembly. The gasket 30 is fitted about the hole 34 in the main 28 with its larger cylinder end 32 always being positioned well clear of the hole 34 and making a firm sealing contact with the main 28. The contacting and sealing end 64 of the gasket 30 as particularly shown in FIGS. 4, 5 and 6 is contoured, preshaped, or formed during its manufacture to match the contour of the smallest main. Each imaginary transverse line 66 of the many side by side lines, which in effect generate this contacting surface, are positioned in respective geometrical planes which are all perpendicular to the centerline of the gasket and which are all ultimately and consequently perpendicular to the centerlines of both the casting 30 and lateral 22, until bulging of the gasket of elastomer occurs as shown in FIG. 3.

FIG. 3 is a side view of most of the components shown in FIGS. 1 and 2 but illustrating the completed installation of the liquid piping saddle 20 to a larger main 29. The lateral 26 has been inserted into the interior 68 of the smaller cylinder 36 of gasket 30, past the semi-circular integral sealing rings 70 and into engagement with the integral inner circular abutment or shoulder 72, which stops the insertion of the lateral 26, and remains clear of the potential flow of liquids. The nuts 58 have been tightened sufficiently to insure the specified tensioning of the wide strap 46, which in turn causes the bulging of the larger cylinder 32 of the gasket of elastomer 30, so the contacting and sealing end 64 makes excellent full contact with the exterior surface of this larger main 29.

In FIGS. 4, 5, and 6, the gasket 30 of elastomer is shown by itself to illustrate its features. Throughout these figures special section lines are used to indicate the form and contour of the contact and sealing end 64 of the larger cylinder 32 of this gasket 30. Before the installation of the gasket 30, this sealing end 64 surface, in respect to its derivative segments, i.e. imaginary transverse lines 66, is always perpendicular to the cylindrical axis or centerline of the gasket 30. The inner edge 74 of the sealing end 64 formed, preshaped, or is contoured to fit the smallest diameter main 28 to which the gasket 30 will be fitted about a hole 34 well clear of liquid flows.

The axial length of the larger cylinder 32 must be long enough to allow the bulging, illustrated in FIG. 3, when the liquid piping saddle 20, 22, or 24 is fitted to a larger main 29 and a good seal must be obtained while still keeping the lateral 26 well spaced from the interior of the main 28. This bulging is effective because the walls of the larger hollow cylinder 32, as viewed at one side or the other in a cross section, such as in FIGS. 2 and 6, are relatively long in comparison to their thickness. The axial length of the smaller cylinder 36 must be long enough to firmly support the inserted end 76 of the lateral 26. This inserted end 76 often is tapered 78, as shown in FIGS. 2 and 3. In the embodiments illustrated in FIGS. 1 through 6 and in FIG. 8, in the interior 68 of the smaller cylinder 36, the integrally formed semi-circular sealing rings 70 are selectively spaced to improve the overall sealing of the laterals 20, 24, to the gaskets 30, 31.

Throughout all the embodiments, as illustrated in FIGS. 2, 3, 5, 6, 7 and 8, the gaskets 30 and 31 have the interior circular abutment 72 formed in what may be called the transitional volume structure 80 of the gaskets 30, 31, between their integral smaller hollow cylinder 36 and the larger hollow cylinder 32. The inside diameter 82 of the abutment 72 must not be greater than the inside diameter of the lateral to avoid any blocking of the incoming flow of liquid, and yet be large enough to form a firm abutment 72, to stop the entry of the inserted end 76 of the lateral 20, 22, or 24, so there will never be any obstruction to the flow of liquid in the mains 28, 29.

Throughout all the FIGS. 1, 2, 3, 4, 6, 7 and 8, all embodiments of the gaskets 30 and 31 are shown having an integral outer circulator abutment or shoulder 84 formed also in what may be called the transitional volume structure 80 of the gaskets 30, 31, between their integral smaller hollow cylinder 36 and the larger hollow cylinder 32. The inside diameter 86 is substantially the inside diameter of the castings 38, 39 and the outside diameter 88, must be large enough to provide a very firm compressive support for the castings 38, 39, preferably being of greater diameter, as illustrated in FIGS. 2, 3, 7 and 8. The castings 38, 39 are fitted respectively about the exteriors of the gaskets 30, 31 and in contact with the outer circular abutment or shoulder 84. When the tightening of wide strap 46 upon turning of the nuts 58 about the tee bolts 48, 50, occurs, the tension forces of the strap are reacted by the compressive forces being withstood by this integral outer circulator abutment 84 of the respective gaskets 30, 31.

In further reference to the sizing of the smaller diameter cylinder 36 and sizing of the larger diameter cylinder 32, the smaller diameter cylinder 36 is the starting reference. It must have an inside diameter to push fit the outside diameter of a lateral, and its outside diameter must provide throughout its length sufficient elastomer to effect an excellent fluid-tight seal.

Thereafter in continuing the sizing of the overall sizing of the elastomeric gaskets 30 and 31, the larger diameter cylinder 32 must have an outside diameter greater than the outside diameter of the smaller diameter cylinder 36, by an amount sufficient to provide a shoulder 84, i.e. an outer circulator abutment 84, i.e. a transition, at the intersection of the cylinders 32, 36 of a width to sufficiently bear the force necessary to sealingly compress the elastomer gaskets 30 or 31 to the respective main pipes 28 or 29.

In FIG. 7, another embodiment of the liquid piping saddle 22 is shown, which is provided when connecting a four inch lateral 26, i.e. clay pipe, to a main 28. The gasket 90 for a clay pipe is substantially similar to the gasket 30 shown in FIGS. 1 through 6, except interior 92 of the smaller cylinder 36 is smooth. Also there are no semi-circular sealing rings 70. However to assist in making an effective seal, the thickness of the small cylinder 36 is reduced and it is surrounded by a hose clamp 94, where it protrudes beyond the fitted casting 38. The casting 38 is the same casting 38 used in the embodiments illustrated in FIGS. 1, 2, and 3.

In FIG. 8, another embodiment of the liquid piping saddle 24 is shown, which is provided when connecting a six inch lateral 26 to a main 28. The larger gasket 31 substantially is proportioned like the smaller gasket 30 used in the embodiments illustrated in FIGS. 1 through 7. The larger casting 39, however, has a strengthening and stiffening flange 96, but otherwise follows the same proportioning, including the proportioned spaced ears 42 with their inclines 44, which help in keeping the fastening components in place during the tensioning of the wide strap 46.

In viewing FIGS. 2, 3, 7 and 8, the presence of the integral continuous interiors of the gaskets 30, 31, 90 in conducting the flow of liquids from the lateral 26 to the mains 28 or 29, indicates that the castings 30 and 31, i.e. clamping rings, do not contact the liquid and therefore they do not have to be liquid tight. Also the encircling portions 98 of the castings 38, 39 are cylindrical. Their ends terminate in respective geometric planes which are perpendicular to the centerline of the castings 30, 31, the respective gaskets 29, 30 and 90, and the respective laterals 26. Their spaced distance away from the mains 28, 29, eliminate any necessity for creating compound curved surfaces of these castings 30, 31, which otherwise might be required to match the contours of the mains 28, 29.

The elastomeric gaskets are permanently shaped at the time of their manufacture to fit only the smallest diameter main pipe without any bulging deformation. Therefore bulging is necessary in order to allow the deformation of the sealing face of the elastomeric gaskets as connections are being made to larger diameter main pipes. In respect to the considerations of the geometry involved, the distance from the plane of tangency to the furthermost intersected points on the main decreases with the increasing diameter of the main pipes. Therefore the longest points or portions of the gasket, i.e. portions of the larger diameter cylinder are too long, when being connected to larger diameter mains, having been initially shaped at the time of manufacture to a smaller diameter main. Consequently, in effect, these portions of the larger diameter cylinder must be shortened and this effective shortening is achieved by the bulging or bending of the walls of the larger diameter cylinder to displace or to accommodate the excess length.

In all embodiments of the elastomer gaskets, their bulging capability to create a seal throughout a wide range of different diameter mains is assured, via their overall design and their manner of installation. As initially positioned, the inside circular edge of each gasket, first contacts the main. Thereafter, as the overall axially compressive load is transmitted through the gasket, it first commences at an axially offset locale at the main, i.e. around the inside circular edge of each gasket, thereby causing a bending force in the gasket walls at this circular location. This bending force, causing a side loading, coupled with the continuing compressive force creates the bulging, which becomes more noticeable, as laterals are being connected to larger diameter mains. Via this bulging action all the imaginative transverse lines in the contoured surface of the gasket come into contact with the outer surface of the main about the hole in the main, which receives the liquid flow from the lateral.

In respect to materials which are used in manufacturing the liquid piping saddle assemblies 20, 22, 24:

The gaskets 29, 30, 90 are made from virgin Styrene-Butadiene-Rubber designated as SBR compounded material for sewer service and they meet or exceed the standards known as ASTM D 2000 3 BA715. Also the gaskets are especially formulated with antioxidant and antrozanant agents to increase their life, i.e. shelf life, etc.;

The adjustable straps 46 are made of stainless steel which is three inches wide for spreading out the clamping forces on the mains 28, 29. These straps are welded to the special bar heads 52, 54, and afterwards, the stainless welds are fully passivated, which means they are chemically treated after welding to return the stainless steel to its original high corrosion resistance and appearance. The tee bolts 48, 50, nuts 58, and washers 62 are designated in reference to one half inch N.C. roll thread fasteners and they are teflon coated; and The saddle castings 38, 39, i.e. clamping rings, are made of high tensile ductile, i.e. nodular, iron, designated as ASTM 536-71 specified iron. These castings 38, 39, are protected by covering them with a yellow corrosion resistant paint.

In partial summary of the many advantages previously referred to or indicated; the following advantages are stated:

In respect to comparative inventory reduction, these gaskets 30, 31, 90, each fit a wide range of diameters of mains 28, 29. For example four inch gaskets of elastomer for four inch laterals fit all mains from 6.275 to 25.80 inches in diameter;

In respect to ease of installation, these liquid piping saddles 20, 22, 24 can be installed by comparatively unskilled laborers, using a socket or open end wrench. The built in stop, i.e. the integral inner circular abutment 72 of all the gaskets 29, 30 and 90 prevents flow blockages in the mains 28, 29 which could otherwise be caused by the inadvertent insertion of the lateral 26, i.e. branch pipe, into a main pipe 28, 29;

In respect to a superior strap, it is made of a strong stainless steel band which is gas metal arc welded to rolled thread stainless bolts that are adjustable over a wide thread range, as the overall clamping force is well distributed by this three inch wide strap 46;

In respect to flexibility, the one piece molded elastomeric gaskets 29, 30 and 90, of the overall assembled liquid piping saddle assemblies after their installation are ready, if necessary, to accommodate the deflections, which may occur between the laterals 26 and the mains 28, 29, that are caused by earth movements. Moreover, any other tendencies to displace the components of these liquid piping saddle assemblies 20, 22, 24, are strongly resisted by the friction forces of the large sealing surfaces of the gaskets 30, 31, 90, and by the holding forces of the wide band or strap 46.

In respect to reliability, the continuous connection of the rubber elastomeric gaskets 29, 30, between the mains 28, 29 and the laterals 26, i.e. between the rim and branch, eliminates potential leak spots or locations. These liquid piping saddle assemblies 20, 22, 24, are successfully tested to pressures well in excess of typical service test requirements.

In respect to the castings serving as the metal clamping rings, 38, 39, essentially only the two sizes are needed. They do not have to be liquid tight and they do not involve compound curve contours. Their spaced ears, in opposite side pairs, having their inclined washer receiving surfaces, help to keep the loose fasteners in place, as the strap is tensioned during installations of the liquid piping saddle assemblies to position laterals 26 along mains 28, 29.

I claim:

1. A liquid piping saddle assembly to connect a branch pipe, to a main pipe of any of several diameters comprising:
   (a) an integral elastomeric gasket having, in line, two hollow intersecting cylinders, having an exterior shoulder formed at their intersection, one of larger diameter than the other, the smaller of the two hollow cylinders being adapted to sealably receive an inserted end of the branch pipe and the larger of the two hollow cylinders being adapted to sealably abut the exterior of the main pipe around a hole in the main pipe;
   (b) a rigid cylindrical collar adapted to be slidably received about the smaller of the two cylinders of said gasket, and to abut the exterior shoulder formed by the intersection of said cylinders, and further adapted to be engaged by an adjustable holding means; and
   (c) an adjustable holding means adapted to partially encircle the main pipe and to engage said rigid cylindrical collar, and to force the said collar and said gasket which is abutted by said collar toward the center of the main pipe with sufficient force to sealably hold said gasket in place against said main pipe.

2. A liquid piping saddle assembly, according to claim 1, wherein:
   (a) said smaller of the two intersecting cylinders of said integral elastomeric gasket has an outside diameter such that when the inside diameter is molded to a dimension which allows sealable insertion of the largest diameter branch pipe for which the said saddle assembly is intended, the thickness of elastomeric cylinder wall is sufficient to provide a reliable seal about the branch pipe;
   (b) said larger of the two intersecting cylinders of said integral elastomeric gasket has an outside diameter which is larger than that of the small cylinder by an amount which creates the said shoulder at the intersection of the two cylinders, so the said shoulder is sufficiently wide to bear the compressive force necessary to sealably hold the said saddle assembly to the main pipe;
   (c) the said large cylinder of the gasket has an end, in being adapted to sealably abut the exterior of the main pipe about a hole made in the main pipe to receive the liquid flow from the branch pipe, commences in a sealing surface, wherein any imaginary transverse line in the surface always lies in a geometric plane which is perpendicular to the common centerline of the said gasket, said collar, and the branch pipe;
   (d) the said sealing surface has an edge, which is nearest the gasket centerline, formed on a curve which approximates the curve of the smallest main pipe for which the said saddle assembly is intended to be fitted;
   (e) the said larger diameter cylinder of the gasket has a cylinder wall which is thin, having a cross section of the said cylinder wall at its longest point which is rectangular and having the distance from the intersection of the two hollow cylinders of the gasket to the furthermost point on said sealing surface which is greater than the distance from the inner to the outer surface of the larger diameter cylinder of the said gasket.

3. A liquid piping saddle assembly, according to claim 2, wherein said rigid cylindrical collar has oppositely spaced pairs of spaced sloping ears to which said adjustable holding means is engaged.

4. A liquid piping saddle assembly according to claim 3, wherein said adjustable holding means comprises:
   (a) two tee headed bolts with their threaded ends respectively extending through said pairs of spaced sloping ears of said rigid collar, washers and nuts being positioned about and on the two tee headed bolts beyond the spaced sloping ears, one tee headed bolt having a single bar welded to a metal strap, the other tee headed bolt having spaced bars welded together with only the outer one of these spaced bars being welded to the bolt; and
   (c) a metal strap welded to the single bar of the tee headed bolt and extended about a main pipe, and threaded through the spaced bars of the tee headed bolt, and ultimately folded back over the inner one of the spaced bars and alongside the main pipe, when the metal strap is sized to a specific outside diameter of a main pipe.

5. A liquid piping saddle assembly to connect a branch pipe to a main pipe of any of several diameters, comprising:
   (a) an integral elastomeric gasket having, in line, two hollow intersecting cylinders having an exterior shoulder formed at their intersection, the smaller of the two hollow cylinders being adapted to sealably receive an inserted end of the branch pipe, and the larger of the two hollow cylinders being adapted to sealably abut the exterior of the main pipe around a hole in the main pipe;
   (b) a rigid cylindrical collar encircling the smaller of the two cylinders of the gasket and abutting the shoulder formed by the intersection of said two cylinders, and having oppositely spaced pairs of spaced sloping ears;
   (c) an adjustable metal strap extended about the main pipe, attached at each end to a bolt, each bolt in turn passing through said ears of said rigid collar, and each bolt in turn having a nut, each nut is threaded on beyond the spaced sloping ears, so that when the nuts are sufficiently tightened said rigid collar is drawn toward the center of the main pipe, causing said gasket to be forced against the surface of the main pipe, sealably holding said gasket in place.

6. A liquid piping saddle assembly to connect a branch pipe to a main pipe, comprising:
   (a) an integral liquid sealing gasket of elastomer having, in line, a smaller diameter hollow cylinder to receive a branch pipe, via a push fit; a hollow transitional volume structure changing from a smaller diameter of a branch pipe to a larger diameter, and a larger diameter hollow cylinder for abutting a main pipe; an interior abutment on the inside of the hollow transitional volume structure and an exterior abutment on the hollow transitional volume structure, whereby a branch pipe is moved into contact with this interior abutment, and whereby the larger diameter hollow cylinder is adapted, when made, because of its preshaping at its initially free end, to sealably fit the outside cylindrical surface of the smallest outside diameter main pipe, without bulging occurring in completing the seal at the main pipe, and also, as necessary, to sealably fit the outside cylindrical surface of layer outside diameter main pipes, with bulging occurring in completing the seal at the exterior of the main pipe, around a hole in the main pipe, sized to receive a flow of liquid from the branch pipe through the liquid sealing gasket and into the main pipe;
   (b) an integral hollow cylindrical metal clamping ring, slidably received about the smaller diameter hollow cylinder of the integral gasket, sliding into contact with the exterior abutment on the hollow transitional volume structure, and having exterior oppositely positioned integral pairs of spaced sloping ears; and
   (c) a fastening subassembly to secure the integral gasket and the integral metal clamping ring to a main pipe, comprising in turn:
      (1) two tee bar headed threaded bolts having their threaded end portions respectively extending through the pairs of spaced sloping ears of the integral metal clamping ring, washers and nuts being positioned about and on the threaded end portions of the two tee bar headed threaded bolts beyond the spaced sloping ears, one tee bar headed threaded bolt having a single tee bar welded both to itself and to a metal strap at the end of the metal strap, the other tee bar headed threaded bolt having spaced tee bars welded together only at their respective ends to thereby form a slot, with only the outer one of these spaced tee bars being welded to this respective tee bar headed threaded bolt; and
      (2) a metal strap welded to the single tee bar of the tee headed threaded bolt and extended about a main pipe, and then threaded through the slot of the spaced tee bars welded together only at their respective ends, and thereafter folded back over the inner one of the spaced tee bars and beyond alongside and adjacent to the outside of the main pipe for a frictional fit with the main pipe and itself, when the metal strap is then sized to be tightened to a specific surface area of an outside diameter of a main pipe, and then when the nuts are tightened, the metal strap is drawn snugly around portions of the main pipe, as the two tee bar headed threaded bolts are drawn in part through the spaced sloping ears of the metal clamping ring, which is then being compressed against the exterior abutment of the transitional volume structure of the integral liquid sealing gasket, which then in turn has its contoured end of the larger diameter hollow cylinder being compressed adjacent the main pipe, to thereby sealably position the entire liquid piping saddle assembly, with an inserted branch pipe in place, about the main pipe, to complete the liquid tight connection of the branch pipe to the main pipe.

7. A liquid piping saddle assembly, as claimed in claim 6, wherein the integral hollow cylindrical metal clamping ring has a surrounding integral flange to strengthen it when it is made in a larger size and slidably received about the smaller diameter hollow cylinder of a larger overall integral gasket.

8. A liquid piping saddle assembly, as claimed in claim 6, wherein the end of the larger hollow cylinder in being adapted to sealably abut the exterior of the main pipe about a hole made in the main pipe to receive the liquid flow from the branch pipe, commences in a surface, wherein any imaginative transverse line in the surface, always lies in a geometric plane which is perpendicular to the common centerline of the gasket, metal clamping ring, and the branch pipe, and upon tightening of the nuts as the strap is drawn tighter, there is a good seal made with the outside cylindrical surface of the smallest outside diameter main pipe without bulging of the walls of the larger hollow cylinder of the gasket, and there is a good seal made with the outside cylindrical surface of the larger outside diameter main pipes with the accommodating bulging of the walls of the larger hollow cylinder of the gasket occurring in greater proportions as these larger outside diameters become larger for respective main pipes, when a branch pipe is being connected to a main pipe.

9. A liquid piping assembly to connect a lateral pipe to a main pipe comprising:
   (a) an elastomeric gasket having in line two hollow cylinders, one larger than the other, the smaller of the said two cylinders adapted to sealably receive an end of the lateral pipe, and the larger of said two cylinders adapted to sealably conform without modification to a large range of diameters of main pipe;
   (b) a hollow metal cylindrical collar slidably received about the smaller of the said two cylinders of the gasket and abutting the larger of the said two cylinders of the gasket at its intersection with said smaller cylinder; and
   (c) an adjustable fastening means to draw the metal collar toward the main pipe, thereby compressing the elastomeric gasket against the main pipe.

10. A liquid piping assembly, as claimed in claim 9, wherein the end of the larger of the said two cylinders of the said elastomeric gasket in being adapted to sealably conform without modification to a large range of diameters of main pipes, has a surface, wherein any imaginary transverse line in the surface always lies in a geometrical plane, which is perpendicular to the centerline of the said gasket, and the intersection of this surface with the inside diameter of the said gasket describes an imaginary curved surface, which has the same curvature as the surface of the smallest diameter main pipe for which the gasket is intended.

* * * * *